United States Patent [19]
Klockenkemper et al.

[11] Patent Number: 5,861,083
[45] Date of Patent: Jan. 19, 1999

[54] AUTOMATED FABRICATION OF CORRUGATED PAPER PRODUCTS

[75] Inventors: Jerome J. Klockenkemper, Zionsville; Dennis M. Judge; Charles D. Moore, both of Indianapolis, all of Ind.

[73] Assignee: Inland Paperboard and Packaging, Inc., Indianapolis, Ind.

[21] Appl. No.: 69,701

[22] Filed: Apr. 29, 1998

Related U.S. Application Data

[62] Division of Ser. No. 730,471, Oct. 11, 1996, Pat. No. 5,783,006, which is a division of Ser. No. 432,038, May 1, 1995.

[51] Int. Cl.[6] .................................................. B32B 31/00
[52] U.S. Cl. ........................ 162/263; 162/287; 162/296; 156/350; 156/351; 156/359; 364/471.02
[58] Field of Search ..................................... 162/263, 287, 162/296; 156/350, 351, 359; 364/471.02; 34/414, 421, 519

[56] References Cited

U.S. PATENT DOCUMENTS

| | | |
|---|---|---|
| 3,004,880 | 10/1961 | Lord .......................................... 156/64 |
| 3,981,758 | 9/1976 | Thayer et al. ............................. 156/64 |
| 4,038,122 | 7/1977 | DeLight .................................... 156/210 |
| 4,056,417 | 11/1977 | League, IV ............................... 156/64 |
| 4,134,781 | 1/1979 | Carstens et al. .......................... 156/64 |
| 4,497,027 | 1/1985 | McGuire et al. ....................... 364/471 |
| 4,589,944 | 5/1986 | Torti et al. .............................. 156/359 |
| 4,947,559 | 8/1990 | Basler et al. ................................ 34/70 |
| 5,244,518 | 9/1993 | Krayenhagen et al. .................. 156/64 |
| 5,527,408 | 6/1996 | Allen ........................................ 156/64 |

OTHER PUBLICATIONS

Werner, A. W., Chapter IX, "Corrugated Machinery," *The Manufacture of Fibre Boxes,* Ed. by Harry J. Bettendorf, 3rd Revised Edition, Jul., 1954, Board Products Publishing Co., Chicago, IL, Title page and pp. 67–88.

*Primary Examiner*—Peter Chin
*Assistant Examiner*—Steven B. Leavitt
*Attorney, Agent, or Firm*—Fitch, Even, Tabin & Flannery

[57] ABSTRACT

Method and equipment for the manufacture of corrugated paper products includes separate heaters for preparing liner and medium components. Data regarding these components is collected and an optimum conditioning for the components is determined.

8 Claims, 9 Drawing Sheets

AUTOMATED FABRICATION OF CORRUGATED PAPER PRODUCTS

This is a division of prior application Ser. No. 08/730,471, filed Oct. 11, 1996, now U.S. Pat. No. 5,783,006 which is a division of application Ser. No. 08/432,038, filed May 1, 1995 which is hereby incorporated herein by reference in its entirety.

BACKGROUND OF THE INVENTION

1. Field of the Invention

This invention relates to the production of corrugated paper products, and particularly corrugated board.

2. Description of Related Art

Sheets of corrugated board may be used for many purposes where protection, separation, or support is required. A corrugated medium is typically formed in a machine which moistens or steams a paper web prior to passing it between two metal rollers cut with alternate flute tips and grooves which are geared to run in complement to each other. This impresses permanent parallel flutes in the paper perpendicularly to the machine direction. The flutes contribute significant rigidity and resistance to products which utilize the resulting corrugated medium.

After a corrugated medium is formed, it may be pasted or otherwise mounted to a liner to produce single-faced corrugated board. If liners are joined to both sides of the corrugated material, a double-wall corrugated board results, and if double-faced and single-faced board are joined together, a double-wall board results.

The economic impetus to produce corrugated board in mass quantities has led to the development of an in-line production process for single-faced, double-faced and double-wall corrugated board. The in-line production processes have several constituent steps, including specific steps for monitoring and adjusting the temperature and moisture contents of the paper webs employed. The ability to accurately monitor and control the various constituent steps involved in the in-line processes can yield substantial economic benefits for the manufacturer and improve quality control.

The many operational steps employed in a commercial process are interdependent, and any one constituent step may result in a variety of distinct undesirable qualities in the final product, and oftentimes it is difficult and time-consuming to isolate the root cause of a defect in the product based merely upon routine observation of the defect. Nevertheless, machine operators have been relied on to make adjustments to these types of machines in response to observations of identifiable defects or sets of defects, based on the operator's intuition or experience.

Typically, adjustments to the machine are made in iterative steps. This, of course, results in waste of not only paper and adhesive, but also in lost production time. It has been observed that perceived acceptable operating conditions lie within a fairly sizeable range of operating conditions, and a rapid determination of a narrower, more accurate operating range of conditions has been sought.

The principal control steps for operating machines making corrugated paper board focuses on the steps of preparing a liner for adhesive joinder, and a substantially different preparation of a paper web for formation into a corrugated medium. While the equipment for performing these different steps bears some similarity, it has been recognized that substantially different operating principles are needed if commercially acceptable products are to be made on a consistent, cost effective basis.

SUMMARY OF THE INVENTION

It is an object of the present invention to provide improved methods for preparing paper liners for adhesive joinder in the manufacturing of corrugated board.

Another object of the present invention is to provide improved methods for preparing paper webs for formation into a corrugated medium.

Another object of the present invention is to provide improved methods for adhesively joining a liner to a medium.

Yet another object of the present invention is to provide improved controls for the automated manufacture of corrugated board comprising one or more liners and layers of paper medium, adhesively joined together.

These and other objects according to principles of the present invention are provided in a method for preparing a paper web for adhesive joinder, comprising the steps of:

providing a paper web having first and second opposed surfaces and containing moisture;

providing heating means with a curved outer heated surface;

providing a wrap arm for wrapping the paper web across the heating means, with the wrap arm movable between different positions so as to bring greater and lesser portions of the paper web in contact with the heating means;

moving the wrap arm between different positions so as to bring a changing amount of the first surface of the paper web in contact with the heating means;

sensing, for the different positions of the wrap arm, the surface moisture carried by the paper web at the first surface and the temperature of the paper web at the first surface;

determining a low temperature wrap arm position at which a rate of increase of surface moisture increases;

determining a high temperature wrap arm position at which a rate of increase of surface temperature is negligible;

determining an offset comprising the difference between the low temperature wrap arm position and the high temperature wrap arm position;

determining a high moisture wrap arm position at which a rate of increase of surface moisture is negligible;

determining a desired operating position of the wrap arm by adjusting the high moisture wrap arm position toward the low temperature wrap arm position by an amount corresponding to the offset; and moving the wrap arm to the desired operating position.

Other objects of the present invention are provided in a method for preparing a paper web for corrugation, comprising the steps of:

providing a paper web having first and second opposed major surfaces and containing moisture;

providing heating means with a curved outer heated surface;

providing a wrap arm for wrapping the paper web across the heating means, with the wrap arm movable between maximum and minimum positions so as to bring greater and lesser portions of the paper web in contact with the heating means;

moving the wrap arm between a series of different positions, between maximum and minimum positions so as to bring a changing amount of the first surface of the paper web in contact with the heating means;

sensing, for the different positions of the wrap arm, and the moisture of the paper web;

determining a low moisture wrap arm position at which a rate of increase of moisture increases;

determining a high moisture wrap arm position at which a rate of increase of web moisture is negligible;

determining an offset comprising one-half of the difference between the low moisture wrap arm position and the high moisture wrap arm position;

determining a desired operating position of the wrap arm by adjusting the high moisture wrap arm position toward the low moisture wrap arm position by an amount corresponding to the offset; and moving the wrap arm to the desired operating position.

Further objects of the present invention are provided in preparing a paper web for adhesive joinder in accordance with the above, preparing a paper web for corrugation in accordance with the above, applying a coating of adhesive between the two, and pressing the two together.

Other objects of the present invention are provided in a method of joining a paper liner to a medium comprising a corrugated paper web, comprising the steps of:

a) forming the liner from a paper web in preparation for adhesive joinder to the medium, comprising the steps of:

providing a paper web having first and second opposed major surfaces and containing moisture;

providing a heater with a curved outer heated surface;

providing a liner wrap arm for wrapping the paper web across the curved outer heated surface, with the liner wrap arm movable between first and second positions so as to bring greater and lesser portions of the paper web in contact with the curved outer heated surface;

moving the liner wrap arm between said first and said second positions so as to bring a changing amount of the first surface of the paper web in contact with the curved outer heated surface;

sensing, for the different positions of the liner wrap arm, the surface moisture carried by the paper web at the first surface and the temperature of the paper web at the first surface;

determining a low temperature liner wrap arm position at which a rate of increase of surface moisture increases;

determining a high temperature liner wrap arm position at which a rate of increase of surface temperature is negligible;

determining an offset comprising the difference between the low temperature liner wrap arm position and the high temperature liner wrap arm position;

determining a high moisture liner wrap arm position at which a rate of increase of surface moisture is negligible;

determining a desired operating position of the liner wrap arm by adjusting the high moisture liner wrap arm position toward the low temperature liner wrap arm position by an amount corresponding to the offset; and moving the liner wrap arm to the desired operating position;

b) forming the medium from another paper web in preparation for adhesive joinder to the liner, comprising the steps of:

providing another paper web having first and second opposed major surfaces and containing moisture;

providing a medium heater with a curved outer heated surface providing a medium wrap arm for wrapping the paper web across the curved outer heated surface, with the medium wrap arm movable between maximum and minimum positions so as to bring greater and lesser portions of the paper web in contact with the curved outer heated surface of the medium heater;

moving the medium wrap arm between a series of different positions, between said maximum and said minimum positions so as to bring a changing amount of the first surface of the paper web in contact with the curved outer heated surface of the medium heater;

sensing, for the different positions of the medium wrap arm, the moisture of the paper web;

determining a low moisture medium wrap arm position at which a rate of increase of moisture increases;

determining a high moisture medium wrap arm position at which a rate of increase of web moisture is negligible;

determining an offset comprising one-half of the difference between the low moisture medium wrap arm position and the high moisture medium wrap arm position;

determining a desired operating position of the medium wrap arm by adjusting the high moisture medium wrap arm position toward the low moisture medium wrap arm position by an amount corresponding to the offset; and moving the medium wrap arm to the desired operating position;

c) coating one of said liner and said medium with an adhesive; and pressing said liner and said medium together.

In accordance with the present invention, there is provided an electronic or other type of control system for automatically regulating quality in a process for manufacturing corrugated board. In one aspect, the present invention employs a high-speed computer for system control. The computer is in communication with a plurality of sensors which are placed in various relevant locations throughout the system. The sensors may include moisture sensors, thermometers, speed sensors, position sensors, buttons and similar devices. The sensors continuously relay information that the computer uses to evaluate the condition of the system. The computer then effects changes in the system, when necessary, through a number of actuators. Actuators may include wrap arm control, roller pressure, valves, lights, thermostats and the like.

The control system in accordance with the invention enables the implementation of corrective adjustments based upon objective, in-line criteria rather than upon a subjective evaluation of a finished product by an operator.

DETAILED DESCRIPTION OF THE PREFERRED EMBODIMENTS

As will be seen herein, the present invention contemplates the manufacture of various paperboard products, including single-faced corrugated board as well as products such as double-faced corrugated board and double-wall corrugated board which employ a single-faced corrugated board as a component. It has been found advantageous in a manufacturing environment to employ a separate in-line manufacturing machine for producing single-faced board, and for providing separate automated in-line machinery for producing other corrugated boards, employing single-faced corrugated board as a component.

Single-Faced Board Manufacture

Figures 1, 2, 4:
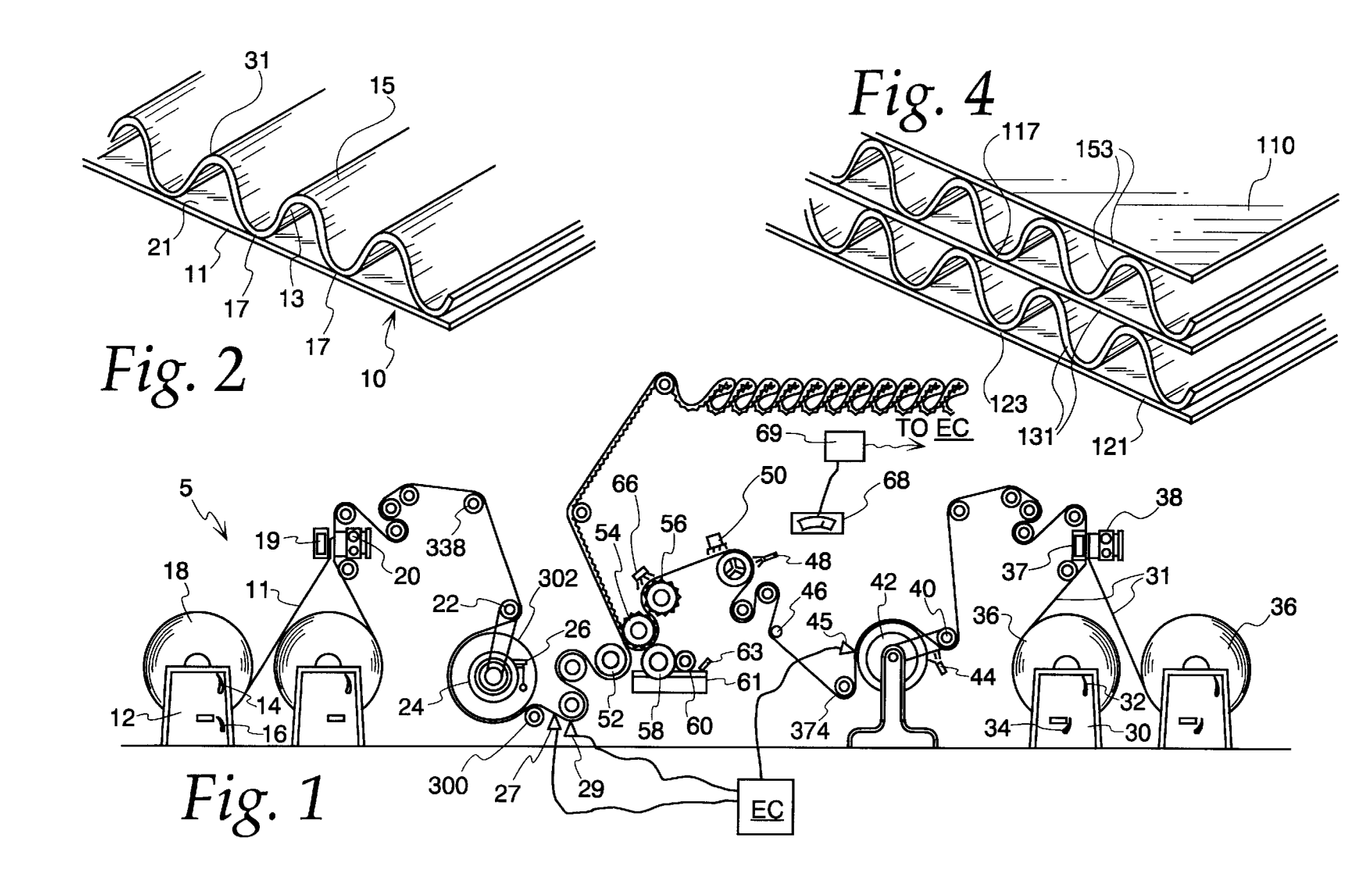
FIG. 1 is a schematic side view of a machine for the manufacture of single-faced corrugated board in accordance with the process of the invention.
FIG. 2 is a perspective view of a single-faced corrugated board produced by apparatus in accordance with the invention.
FIG. 4 is a perspective view of a double-wall corrugated board produced by apparatus in accordance with the invention.

Turning now to FIGS. 1 and 2, an improved manufacturing apparatus 5 and related method is provided for the manufacture of single-faced corrugated board. The improvements are directed to the automated control of certain parameters of manufacture based on objective, substantially continuous sensor readings along in-line manufacturing apparatus. The in-line manufacturing apparatus 5 for manufacturing single-faced corrugated board includes roll stands 12 which retain rolled webs 18 of liner 11 for payout as the rolled webs 18 are rotated on the stand 12. One rolled web is employed at a time. The stand 12 has a skew adjustment 16 to properly align the liner 11 as it is spun off the web roll 18, and the stand 12 has a brake 14 to adjust the tension of the liner 11 as it is fed into a splicer 19. The splicer 19 also has a tension adjustment 20.

After passing through a series of rollers, including roller 338, the liner 11 is wrapped around the outer curved surface 302 of a substantially cylindrical preheater 24. The heat and pressure applied to the wrapped portion causes moisture from the interior of the liner 11 to move toward the surface of the liner. The amount of wrap, i.e., the angular extent of contact between the liner 11 and the outer, heated surface of preheater 24, is actuated by a preheater wrap arm 22 which moves across the outer preheater surface to adjust the amount or angle of contact. The preheater 24 also has a brake 26 to adjust the amount of tension in the liner 11.

As shown in FIG. 1, liner 11 is wrapped around the lower left part of preheater 24. If desired, liner 11 could also be wrapped around the upper right part of preheater 24, so as to treat the opposite major surface of liner 11. In this latter arrangement, liner 11 would pass over the left hand end of wrap arm 22, with counterclockwise movement of wrap arm 22 causing a greater amount of wrap. However, according to one aspect of the present invention, whichever surface of the liner contacts preheater 24, the surface of liner to be monitored for calculation of an optimum wrap arm position is the surface at which an adhesive bond is to be formed.

After being wrapped, the liner passes a surface moisture sensor 27 to measure the surface moisture on the liner 11 and to relay accumulated data through conductors to an electronic controller EC. In order to properly form the single-faced corrugated board (and corrugated products employing this board), it is critical that there be neither too much nor too little moisture on the surface of the liner 11. In addition to warping, improper levels of moisture may also contribute to poor subsequent adhesion between the liner and a corrugated medium 31. Shortly after passing the moisture sensor 27, the liner 11 passes a temperature sensor 29 which also relays information to the electronic controller EC. The liner 11 is then ready for mounting to corrugated medium.

The pre-corrugation steps for the preparation of paper web comprising medium 31 are to some extent similar to those for preparing the liner 11 for mounting. There is a rolled web 36 which rotates on a roll stand 30. A skew adjustment on the stand 30 keeps the medium 31 properly oriented and a brake 32 controls the tension in the medium 31. The medium is also run through a splicer 37 which has a tension adjustment 38.

The medium 31 is then wrapped around the outer surface of a substantially cylindrical preconditioner 42. Heat and pressure are applied to the wrapped portion of the medium to cause moisture within the medium to more evenly distribute throughout the thickness of the medium. If necessary, additional moisture can be added to the surface of the medium 31 at the beginning of the wrap by a preconditioning steamer 44. The amount of wrap, i.e., the angular extent of contact between the medium 31 and the heated outer surface of preconditioner 42 is actuated by a wrap arm 40 which moves across the outer surface of the preheater to adjust the amount of contact.

An interior or averaging type of moisture sensor 45 detects the moisture in the paper web 31 and sends a signal indicative of the moisture reading to electronic controller EC. In addition to warping, improper levels of moisture in a medium 31 may also contribute to improper shaping and size of the corrugated medium, and may also contribute to improper adhesion of the corrugated medium to liner 11, and other paper board that it may be combined with. Unlike the conditioning of the liner 11, which utilizes moisture value at the surface of the paper web, it has been found that better results are achieved at the medium preconditioner 42, if internal, average moisture values are measured.

Generally speaking, the medium 31 is wrapped around the upper part of preconditioner 42. However, if desired, medium 31 could be wrapped around the lower half of preconditioner 42, passing over the left hand side of wrap arm 40 shown in FIG. 1. While in many instances it may be preferred that the surface of medium 31 to be conditioned by contact with preconditioner 42 is that surface which later receives an adhesive coating, either surface of the preconditioned medium may be monitored, since it is the internal moisture value rather than the surface moisture value which is important.

The medium 31 then begins the corrugation process, passing a medium spreader bar 46, with an adjustment mechanism, to achieve a more uniform tension in the medium 31. The medium then passes through optional showers 48 and 50, and an oil mist applicator 66. The medium 31 winds around an upper corrugator roll 56, comprising an alternately ridged and grooved roller. The medium 31 passes between the upper corrugator roll 56 and a lower corrugator roll 54 which is also alternately ridged and grooved so that it generally rolls in complementary surface contact with the upper corrugator roll 56. As the medium 31 passes between the two rolls 54 and 56, the alternatingly ridged and grooved surfaces form the parallel flutes in the medium 31 (FIG. 2). The pressure of the surface contact between the two rolls is adjustable since inadequate pressure yields poor flute formation while excessive pressure may damage, or even completely sever, the medium 31. The corrugator rolls 54, 56 cooperate so as to impart a continuous wave shape which is visible, for example, in FIG. 2. If the paper web comprising medium 31 is not properly preconditioned, it is likely that medium 31 will not have the desired shape after passing through the corrugator rolls 54, 56. Further information concerning the proper preconditioning of the paper web comprising medium 31 will be given hereinafter.

As the medium 31 exits the corrugator rolls 54, 56, it passes through a nip between roll 54 and a glue roll 58. The glue roll applies an adhesive film, such as, but not limited to, a starch product, to one side of the corrugated medium 31, covering primarily only the flute tips on that side. Referring to FIG. 1, the corrugated medium 31, having inside and outside surfaces, 13 and 15 respectively, is glued at its inner tips 17 to the inside surface 21 of the liner 11 (i.e., that portion of corrugated web 31 in contact with liner 11, as can be seen in FIG. 2). The glue roll 58 is located in a glue pan 61 having a glue pan dam adjustment. Adhesive in the glue pan is carried by the glue roll 58 and is smoothed into a controlled film by a wiper roll 60 which forms a nip for the film with the glue roll 58. Along side the wiper roll 60 is a wiper blade 63 which has an adjustment mechanism to regulate the thickness of the film of adhesive.

The corrugated medium 31 and the liner 11 are then pulled together between the pressure roll 52 and the lower corrugator roll 54, where the adhesive-covered flutes of the corrugated medium 31 are pressed against the liner 11, bonding linearly along each flute. The operating speed of the manufacturing apparatus 5 is displayed by an operating speed indicator 68, which is coupled through a speed controller 69 to electronic controller EC. The speed controller 69 is coupled to the drives (not shown) for the corrugator rolls 54, 56 and pressure roll 52 to control the rates of speed of the webs passing through the manufacturing apparatus 5. The resultant product is single-faced corrugated board 10, as seen in FIG. 2, which may be used as such or incorporated into the manufacture of double-faced or double-wall corrugated board or other paper products.

Double-Wall Corrugated Board Manufacture

Double-wall corrugated board, indicated at 110 in FIG. 4, is manufactured by mounting a top single-faced corrugated board 153 to a middle single-faced corrugated board 131 so that the tips 117 of the top board 153 adhere to the liner of the middle board 131. The middle board 131 is mounted, at its tips 123 to a liner 121. Thus, each liner is separated by a corrugated medium as shown in FIG. 4. Attention will now be directed to the double-backer assembly apparatus shown in FIGS. 3a, 3b.

Figure 3A:
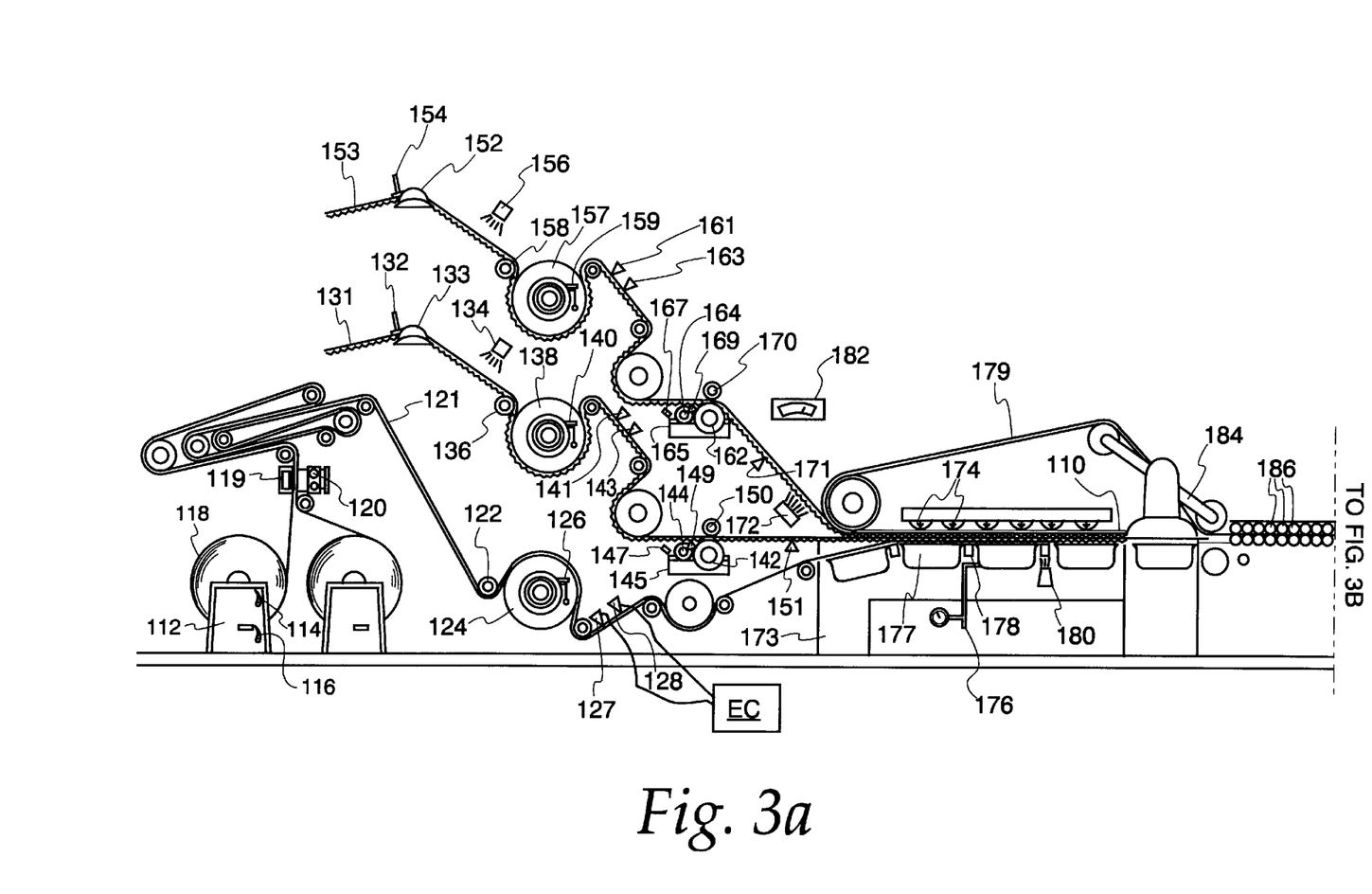
FIGS. 3a and 3b show a schematic side view of a machine for the manufacture of double-wall corrugated board in accordance with the process of the invention.

As in the manufacture of single-faced board, there is a liner 121, spun from a web 118 which rotates on a roll stand 112 having a brake 114 and a skew adjustment 116. The skew adjustment 116 controls the orientation of the web 118 and the brake 114 adjusts the tension in the liner 121. Also affecting this tension is an adjustment mechanism 120 on the splicer 119.

The liner gets wrapped around part of the perimeter of a substantially cylindrical preheater 124. The heat and pressure of the wrap causes some of the moisture in the liner 121 onto the surface of the liner 121. The amount of wrap, i.e., the angular extent of contact between the liner 121 and the preheater 124, is controlled by a preheater wrap arm 122 which moves to adjust the amount of contact. The preheater 124 also has a brake 126 to adjust the amount of tension in the liner 121.

After being wrapped, the liner 121 passes a moisture sensor 127 to measure the amount of surface moisture on the liner 121 and to relay accumulated data to the electronic controller EC through conductors (not shown). In order to properly form the double-faced corrugated board, it is critical that there be neither too much nor too little moisture on the surface of the liner 121. Shortly after passing the moisture sensor 127, the liner 121 passes a temperature sensor 128 which also relays information to the electronic controller EC through conductors (not shown). The liner 121 is then prepared for mounting.

As illustrated in FIG. 3a, double-wall board has, in addition to the liner 121, two pre-formed single-faced corrugated boards, 131 and 153, constructed as explained above with reference to FIGS. 1 and 2. The height and "pitch" of the flutes of the corrugated boards 131 and 153 need not be identical. For example, the flutes of one corrugated board could be higher or lower than the flutes of the other corrugated board. Further, it should be realized that the corrugated board 153 could be omitted, to form a double-faced board from the joinder of corrugated board 131 and liner 121.

The inner board 131 passes over a bridge guide unit 133 having a guide adjustment to control lateral displacement of the board 131 and a brake 132 to keep the single-faced board 131 in line with the liner 121 and to insure that a consistent amount of board 131 is drawn over a given time period. The board 131 then passes an optional water spray 134, which may be employed in some instances to help in reducing subsequent warp problems.

The board 131 then gets wrapped around part of the perimeter of a substantially cylindrical preheater 138. The heat and pressure of the wrap forces some of the moisture in the board 131 onto its surface. The amount of wrap, as determined by the angular extent of contact between the board 131 and the substantially circular preheater 138, is actuated by a preheater wrap arm 136 which moves to adjust the amount of contact. The preheater 138 also has a brake 140 to adjust the amount of tension in the board 131.

After being wrapped, the board 131 passes a moisture sensor 141 to measure the amount of surface moisture on the board 131 and to relay accumulated data through wires (not shown) to the electronic controller EC. In order to properly form the double-faced corrugated board, it is critical that there be neither too much nor too little moisture on the surface of the board 131. Shortly after passing the moisture sensor 141, the board 131 passes a temperature sensor 143 which also relays information to the electronic controller EC through wires (not shown).

The board 131 continues its in-line progression, passing through a surface contact point between a rider roll 150 and a glue roll 142. The glue roll 142 applies an adhesive film to the corrugated side of board 131, covering primarily only the flute tips on that side. Part of the glue roll 142 is submerged in adhesive which sits in a glue pan 145. The adhesive sticks to the glue roll 142 and is smoothed into a film by a wiper roll 144. Alongside the wiper roll 144 is a wiper blade 147. Optional sensors 149, 151 may be employed to double-check the moisture content or other physical properties of the intermediate product.

The outer board 153 passes over a bridge guide unit 152 having a guide adjustment to control lateral displacement of the board 153 and a brake 154 to keep the single-faced board 153 in line with the liner 121 and to insure that a consistent amount of board 153 is drawn. The board 153 then passes a water spray 156 designed to help in reducing subsequent warp problems.

The board 153 then gets wrapped around part of the perimeter of an optional substantially cylindrical preheater 157. The amount of wrap, the angular extent of contact between the board 153 and the substantially circular preheater 157, is actuated by a preheater wrap arm 158 which moves across the preheated surface in the plane of the in-line process to adjust the amount of contact. The preheater 157 also has a brake 159 to adjust the amount of tension in the board 153.

After being wrapped, the board 153 passes a moisture sensor 161 to measure the amount of moisture and to relay accumulated data to the electronic controller EC. Shortly after passing the moisture sensor 161, the board 153 passes a temperature sensor 163 which also relays information to the electronic controller EC.

The board 153 then passes through a nip between a rider roll 170 and a glue roll 162. The glue roll 162 applies an adhesive film to the corrugated side of the board 153, covering primarily only the flute tips on that side. Part of the glue roll 162 is submerged in the adhesive which sits in a glue pan 165. The adhesive sticks to the glue roll 162 and is smoothed into a film by a wiper roll 164. Along side the wiper roll 164 is a wiper blade 167. After passing an optional steam shower 172, the outer board 153 is ready for mounting. Optional sensors 169, 171 may be employed to monitor physical properties of the intermediate product, if desired.

Figure 3B:
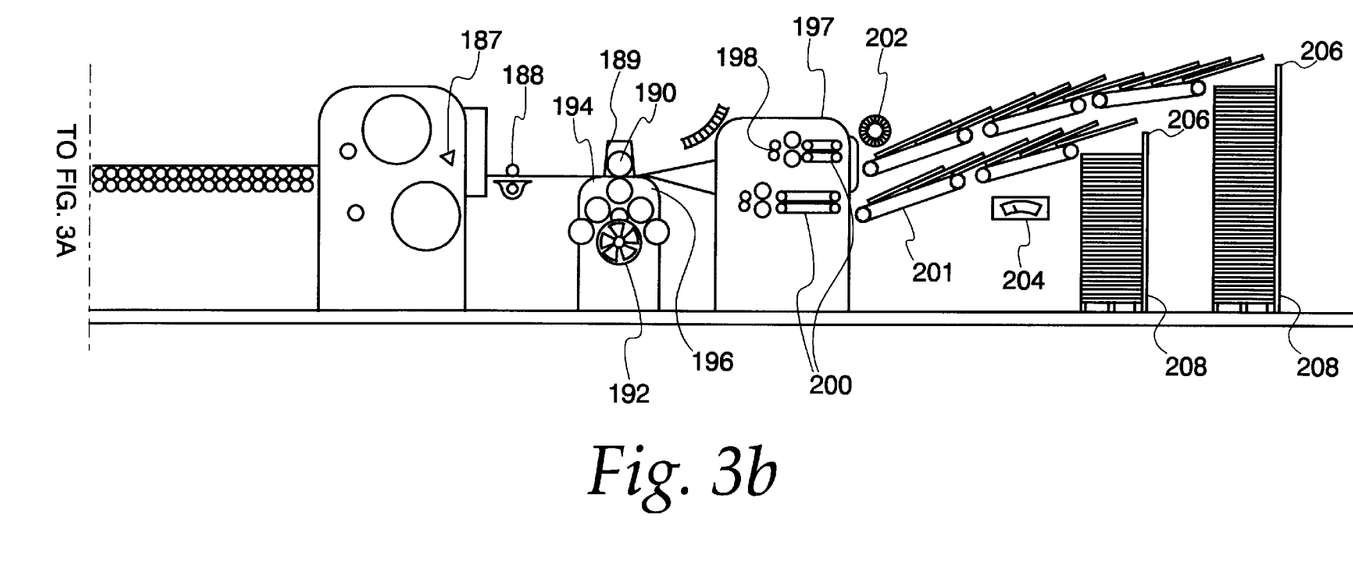

The liner 121, the inner single-faced corrugated board 131, and the outer single-faced corrugated board 153 are brought together along a machine 179 riding atop a hot plate table 173. The speed of the double-backer and the machine 179 are displayed by an operating speed indicator 182. The adhesive film on the corrugated side of the outer board 153 adheres to the liner side of the inner board 131 while the adhesive film on the corrugated side of the inner board 131 adheres to the liner 121. To strengthen the bonds and to form the double-wall corrugated board 110, pressure is applied by a series of hold-down devices 174 which exert force upon the board 110 as it passes. Simultaneously, the board 110 can be lifted by machine risers 178 enabling it to pass slightly above the hot plates 177 (which are energized by heat source 176) when operation of the manufacturing apparatus is temporarily halted.

In the preferred embodiment of the invention, there are fan blowers 180 for reducing warp in lighter classifications of board and for decreasing or eliminating the formation of brittle board. To avoid slippage of the machine, there is a machine tension adjustment 184 near the back of the hot plate table 174.

The board 110 is then driven across traction section rollers 186 until it passes a sensor 187 for detecting product. In the preferred embodiment, an anti-skid coating may then be applied by an anti-skid coating applicator 188 in order to meet the special needs of a particular use.

The board 110 subsequently encounters a slitter 189, having a slitter knife arrangement 190 with a lateral adjustment mechanism 192 which controls a horizontal score alignment 194 and a vertical score alignment 196. The board 110 is then pulled through a cutter 197 by knife feed rolls 198 which subsequently eject the freshly cut boards 110 through sandwich machines 200.

Finally, the cut boards 110 exit the cutter 197 onto an upwardly inclined downstacker machine 201, where, after being rolled under a snubber roll 202 while riding up the machine 201, they are stacked up against a substantially vertical backstop 206 emanating from downstacker rollers 208 beneath the stack. A machine speed adjustment 204 controls the rate at which the boards 110 are stacked.

Although double-wall products have been described, the present invention also contemplates manufacture of triple-wall and other multiple-wall products as well.

Preheater Control System

Figure 5:
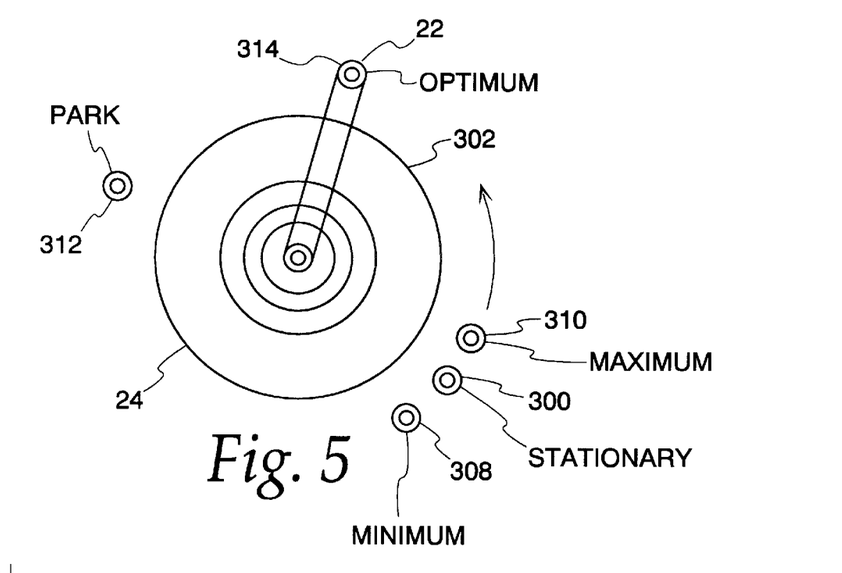
FIG. 5 is a schematic diagram of a heating means employed in the practice of the present invention.
Figure 6:
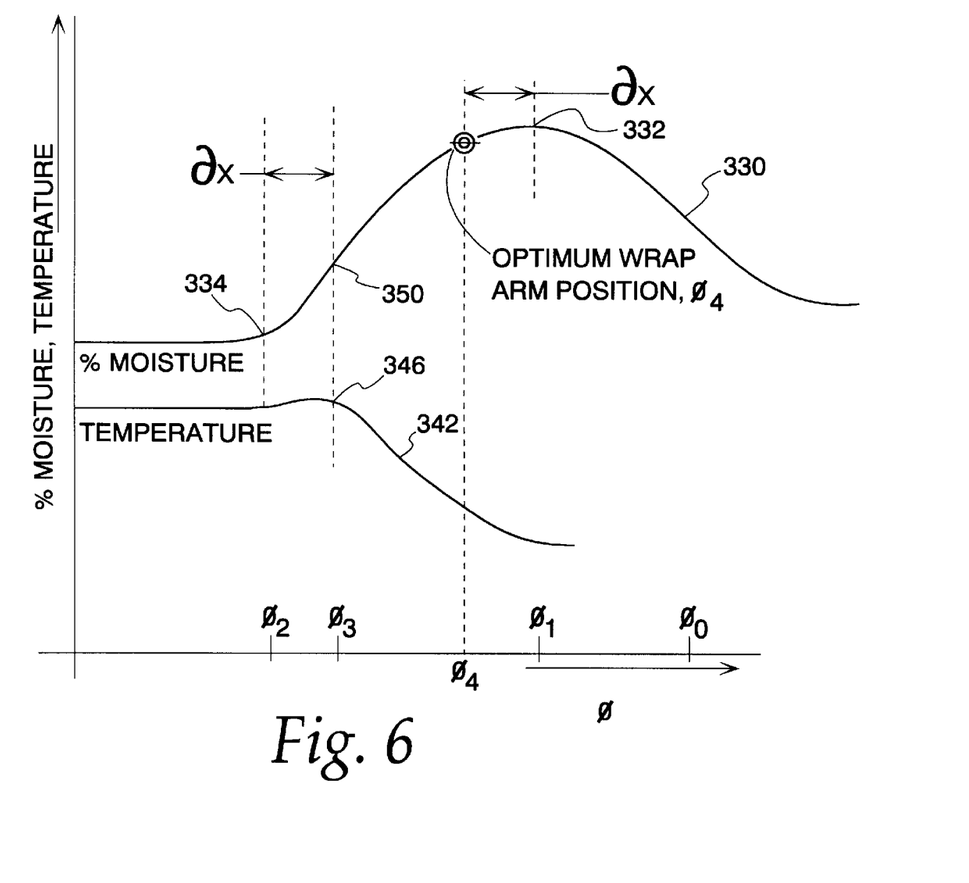
FIG. 6 is a diagram indicating operation of the heating means of FIG. 5.

Referring now to FIGS. 5 and 6, operation of the preheater controls will be described in greater detail. FIG. 5 shows preheater 24 with wrap arm 22 located in a representative optimum running position. A stationary guide roller 300 guides web 11 leaving the preheater stage, on its way toward travel over pressure roller 52, in preparation for an adhesive joining operation. As mentioned above, wrap arm 22 is movable, being mounted for rotation about the outer surface 302 of preheater 24.

Outer surface 302, as mentioned, is preferably of a cylindrical shape, but may alternatively comprise virtually any curved shape as may be desired. In the preferred embodiment, wrap arm 22 is mounted for movement so as to be kept at a constant distance from outer surface 302, although this is not necessary. For example, outer surface 302 could, in cross section, have an arcuate shape which need not be circular. The wrap arm 22 would be mounted for movement across the outer surface with the distance between the wrap arm and the outer surface, generally speaking, not being critical, since the wrap arm functions as a "lead-in" point for guiding incoming web material.

In the preferred embodiment, wrap arm 22 is movable between a minimum (unwrapped) position 308 and a maximum (fully wrapped) position 310. In practice, it has not been found unnecessary to move the wrap arm 22 fully to the minimum position 308. Rather, it has been found sufficient to move the wrap arm 22 to a "park" position 312 indicated in FIG. 5. As indicated in FIG. 5, the representative, or typical optimum operating position 314 lies between the full wrap position 310 and the park position 312.

Determination of the optimum operating position 314 will now be described, with additional reference to FIG. 6. Initially, the wrap arm 22 is moved to the full wrap, maximum position 310 and data collection within the electronic controller EC is made ready. Moisture and temperature readings are then taken from sensors 27, 29 as the wrap arm is moved from the maximum wrap position 310 to the minimum wrap or park position 312, and moisture and temperature data is stored for angular positions $\phi$ of the wrap arm 22.

Starting at the left hand end of FIG. 6, moisture data is collected at the full wrap position. As the wrap arm 22 is moved to the position, the moisture curve 330 is generated toward the right hand end of FIG. 6. With continued movement of the wrap arm 22, moisture detected by sensor 27 (see FIG. 1) increases, passing through a "knee" in curve 331 identified by the reference numeral 334. With continued movement of wrap arm 22 toward the park position, the moisture curve 330 rises to a maximum position 332 at which the rate of rise of moisture increase is negligible, i.e., passes through a zero slope point. With further movement of the wrap arm 22 toward the park position 312 (see FIG. 5), moisture level in the paper medium drops (see position $\phi_0$).

As the wrap arm travels toward point $\phi_1$ (corresponding to the negligible rate of increase point 332 on curve 330) from point $\phi_2$ (corresponding to data point 334 on curve 330), temperature data shown in FIG. 6 as curve 342 is collected. The point 346, the maximum point on curve 342, is noted at position $\phi_3$, corresponding to a negligible rate of increase of temperature in the paper web. The moisture value 350 corresponding to wrap arm position $\phi_3$ can be determined from curve 330.

The angular displacement $\delta_x$, that is, the difference between wrap arm positions $\phi_3$ and $\phi_2$ is calculated as an offset value. As mentioned above, wrap arm position $\phi_1$ is noted as the maximum moisture point on curve 330. The offset $\delta_x$ is applied from angular position $\phi_1$ to arrive at the optimum wrap arm position $\phi_4$, and this is the angular position of wrap arm 22 indicated by reference numeral 314 in FIG. 5, and which also indicates the same position of wrap arm 22 illustrated in FIG. 2.

According to one aspect of the present invention, it has been found desirable to avoid operating the wrap arm at position $\phi_1$ since there is some risk, when operating in this mode, that moisture will be lost from the web (i.e., operation to the right of point 332 in FIG. 6). The operating point $\phi_4$, indicated as the optimum operating position in FIG. 6, closely corresponds to the high temperature dew-point on the flute side of liner 11 (that side bonded to the flutes of the corrugated medium). This high temperature dew-point attained according to principles of the present invention creates the maximum amount of heat and makes available the optimum amount of moisture on the flute side of the liner, enhances the bond of the liner to the fluted medium.

As indicated above, it is important that the surface dew-point of liner 11 be chosen as the control target. When multiple liners (including liners of multiple single-faced board) are employed in a manufacturing process, the present invention automatically balances the moisture content of the various liner components at their highest surface temperatures, thus optimizing surface moisture level and surface temperatures, important for reliable, successful bonds using conventional corrugated manufacturing equipment. As will be appreciated by those skilled in the art, balancing of the moisture levels of liners (and other components) in a corrugated product greatly encourages and oftentimes is alone sufficient to ensure that a flat corrugated product will be produced. In effect, warpage of corrugated products can be eliminated automatically and production can continue in a routine manner without regard to imbalances of moisture levels in various liner components.

Preconditioner Control System

Figures 7, 8:
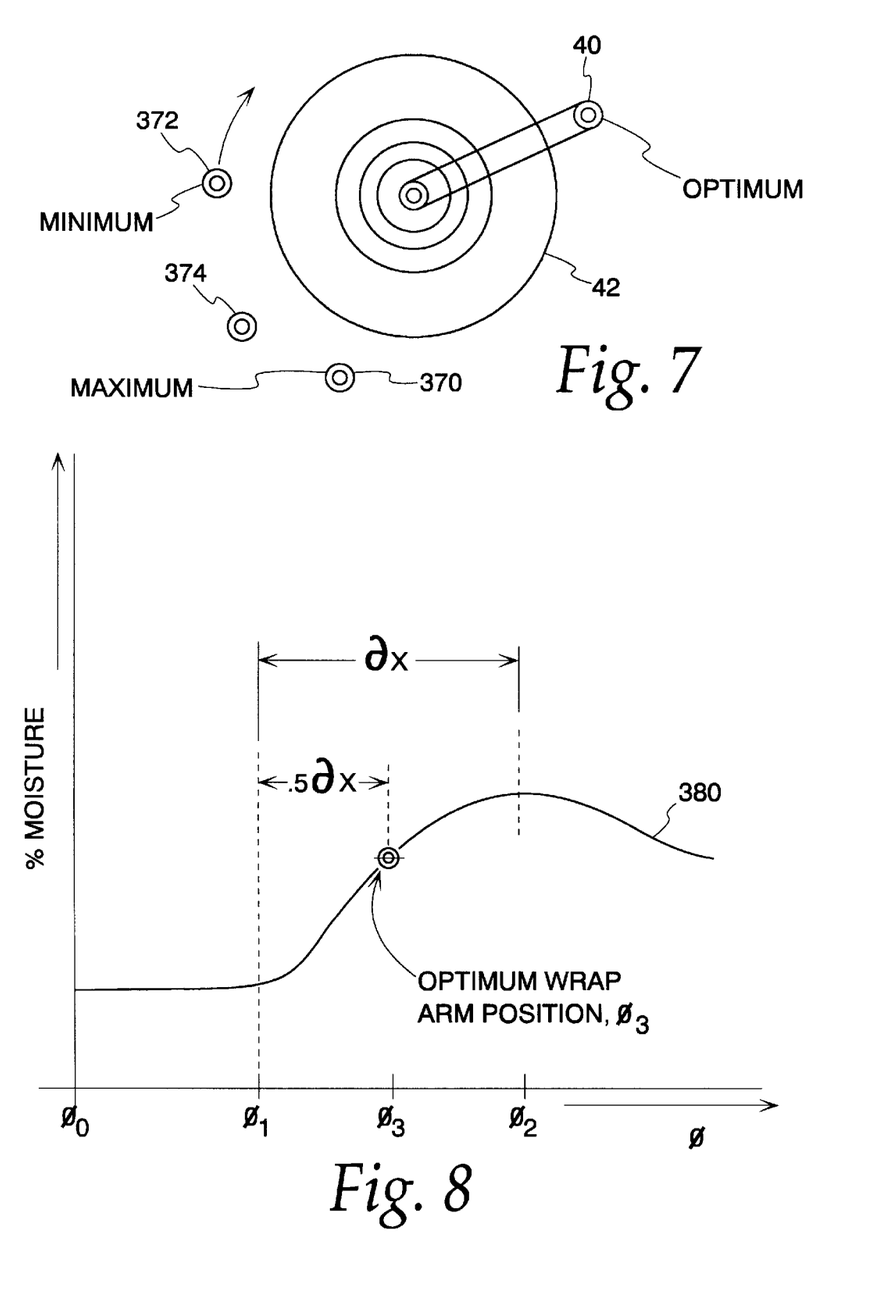
FIG. 7 is a schematic diagram of another heating means employed in the practice of the present invention.
FIG. 8 is a diagram indicating operation of the heating means of FIG. 7.

Turning now to FIGS. 7 and 8, operation of the preconditioner 42 will be described in greater detail. The wrap arm 40 is, in the preferred embodiment, mounted for rotation about the center of cylindrical preheater 42, between a maximum wrap position 370 and a minimum wrap position 372. The operating positions 370, 372 lie on either side of a stationary guide roller 374. In the preferred operation, wrap arm 40 is initially moved to the minimum wrap position 372 and data collection from sensor 45 is made ready.

As the wrap arm is moved from minimum position 372, to maximum position 370, moisture data is collected, represented by curve 380 in FIG. 8. The minimum wrap position 372 corresponds to position $\phi_0$ in FIG. 8, and, as can be seen in FIG. 8, moisture values remain relatively constant until position $\phi_1$, when a rate of increase of moisture with wrap arm position begins. As wrap arm 40 is moved to the maximum wrap position 370, a negligible rate of increase of moisture is detected at a wrap arm position $\phi_2$. Thereafter, with increasing movement of wrap arm 40 toward the maximum position 370, a decrease in moisture in the web is detected (i.e., portion of curve 380 to the right of position $\phi_2$).

The angular displacement $\delta_x$ between wrap arm positions $\phi_1$ and $\phi_2$ is determined, along with the arithmetic mean, position $\phi_3$. The position $\phi_3$ is chosen as the optimum wrap arm position for operation of preconditioner 42. Unlike the operation of heater 24, which treats liner 11, the preconditioner 42 is concerned with the uniform distribution of moisture throughout the thickness of the medium 31. It has been found that by calculating position $\phi_3$ using the arithmetic mean of $\delta_x$, then an optimum result in web 31 is achieved, both for corrugation in the subsequent treatment of web 31, and also for bonding of the medium 31 to liner 11. The humidity sensor 45 may be any one of a number of commercially available humidity sensors which are employed to detect humidity values within a paper web, as opposed to humidity sensor 27, which can be any one of a number of commercially available moisture detectors for detecting surface moisture in paper web 11.

Preconditioning of medium 31 according to the above-described principles achieves a pliable, unbroken fluting of the medium, even after combining the medium with other components of a paperboard product. Treatment of the medium in accordance with the present invention results in expanded, swelled, soft and pliable fibers within and throughout the medium paper. This allows for better flute formation, with consistent control of flute height, better absortivity for the adhesive, resulting in stronger bonds at the flute tips, and also allows for proper setting of adhesive since an optimally preconditioned medium is provided. As a result, flute formation is improved along with better bonding at the flute tips, with enhanced overall production speeds and improved quality values.

Electronic Control—Preheater Control Operation

Figure 9A:
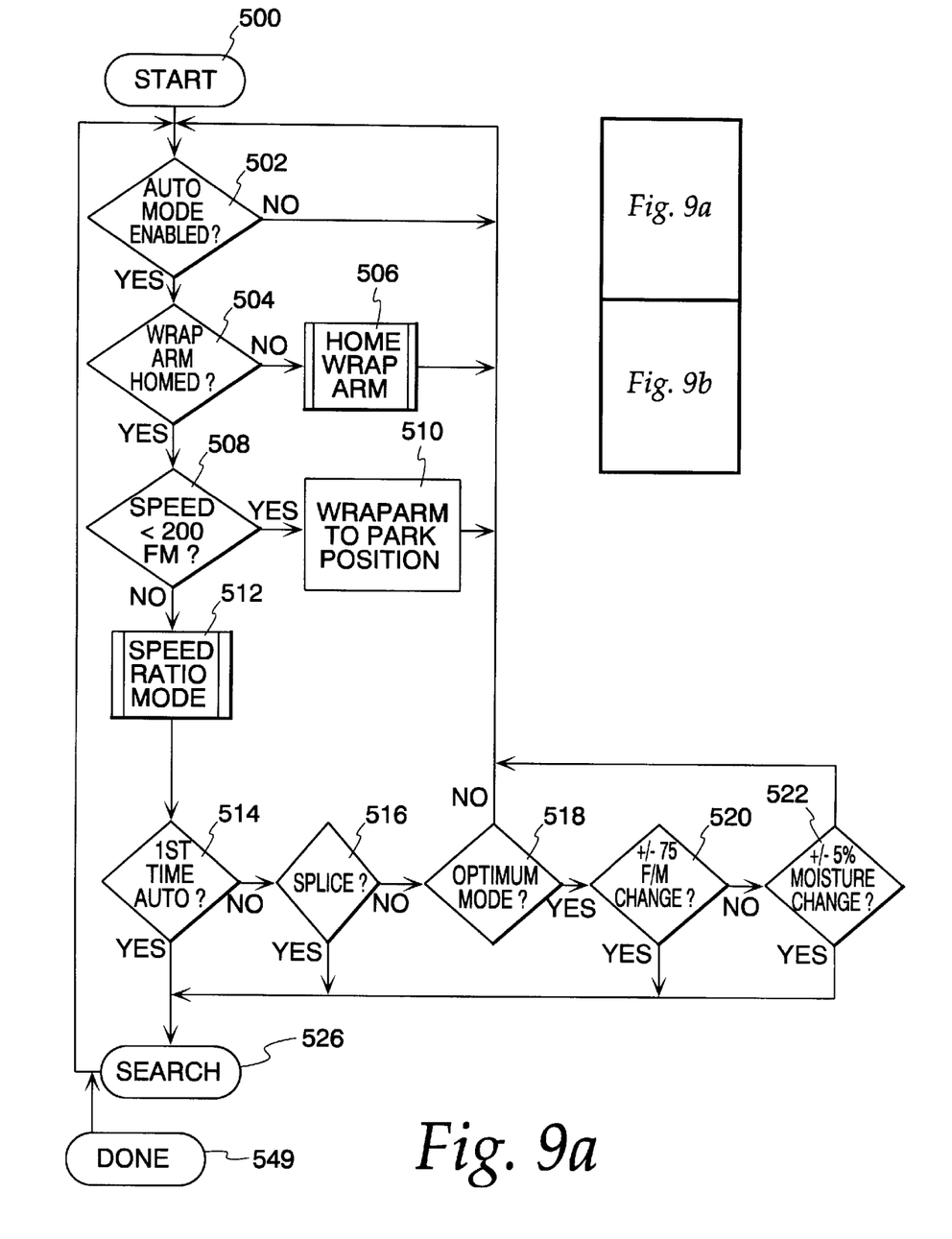
FIGS. 9a and 9b together show a flow chart indicating control of the heating means of FIG. 5.
Figure 9B:
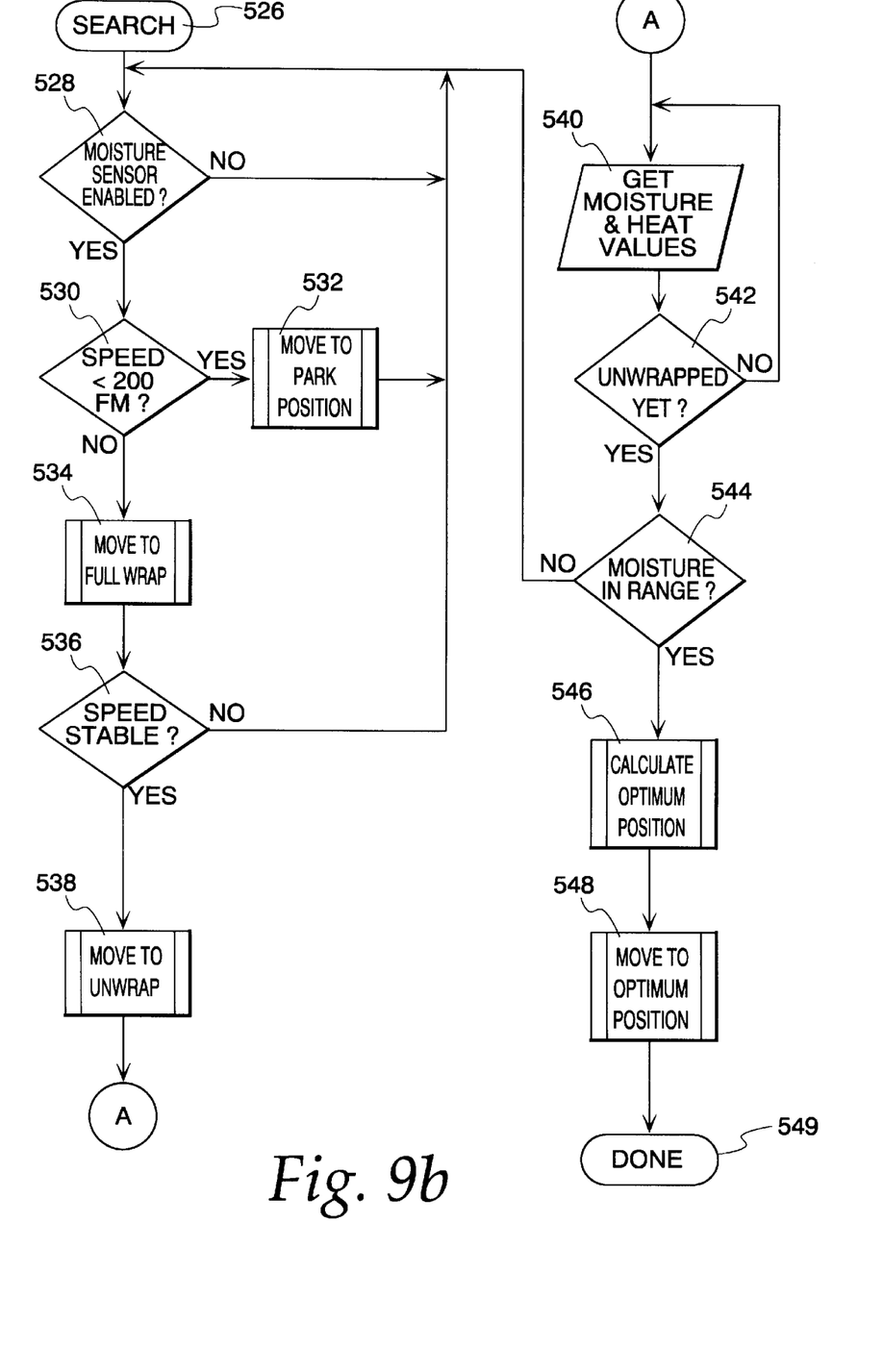

Turning now to FIGS. 9a, 9b, operation of manufacturing apparatus 5 will now be described. The flow diagram shown in FIGS. 9a, 9b pertains mostly to operation of preheater 24, under control of electronic controller EC, although the operating system also responds to web speeds indicated by speed indicator 68, under control of speed control circuit 69. Although there are several webs that can be accommodated by the present invention, it should be understood that reference to web speed here is concerned only with a liner, such as the liner 11 conditioned by heater 24. As mentioned, operation of manufacturing apparatus 5 is begun with loading the rolled webs 18, and threading the webs through the system, as illustrated in FIG. 2, for example. The heaters and optional showers are brought up to operating temperatures and pressures in preparation for a production run, indicated in FIG. 9a by block 500. Next, as indicated in decision element 502, query is made as to whether an automatic operating mode is enabled. Generally speaking, this contemplates two automatic control modes, the first focusing on the optimum positioning of wrap arm 22, and the second relating to adjustments in wrap arm position in direct proportion to the speed of web 11 past heater 24, as will be seen herein. If the automatic mode is not enabled, the electronic controller EC continues to poll the system to determine if the automatic mode has been updated.

With the automatic mode enabled, control is transferred to decision block 504 which tests whether the wrap arm 22 is homed to the maximum position 310 in FIG. 5. If necessary, block 506 energizes the drive system (not shown) for wrap arm 22 to move it to the desired angular position. Next, a test is conducted in decision block 508 to determine if a minimum critical web speed is maintained in the machine, and, if not, block 510 moves wrap arm 22 to park position 312 (see FIG. 5.

Control is then transferred to block 512, directed to a secondary control of manufacturing apparatus 5. Under control of block 512, the speed of web 11, controlled by control system 69 (see FIG. 1), is monitored for ongoing changes during system operation. The relation between web speed and desired wrap position is preferably proportional, i.e., the two values are directly related. Basically, control block 512 calls for greater wrap as web speed increases, and lesser wrap as web speed decreases. It should be recognized that the wrap arm 22 can be manually positioned by an operator with or without assistance from system instrumentation. A control block 512 would perform web speed-related adjustments to such manual wrap arm positioning if the auto mode is enabled (see block 502).

Control is then transferred to block 514 which tests whether the automatic mode was previously initiated. If not, a test is made in block 516 as to whether a splice has been made in web 11. If a splice has been made, the control system assumes that a recalibration is necessary. Control block 518 tests whether an optimum wrap arm operation has previously been achieved, and if not, control is transferred to the beginning of the control loop, at block 502.

If an optimum mode has been previously achieved, a test is made in block 520 as to whether the web speed has experienced an unacceptable perturbation, and if not, a test is made in block 522 to see whether an unacceptable perturbation in moisture has occurred. Block 520 tests whether a relatively small change in web speed has occurred. If a change is below a preset threshold amount, then control block 512 is allowed to proceed with a ratio control of the wrap arm position, directly related to the web speed. If, however, block 520 detects an unacceptably large change in speed, then control block 512 is, in effect, relieved of further control, until a new operating point has been determined by a search routine indicated in block 526.

Referring now to FIG. 9b, a search initiated in block 526 transfers control to block 528 which tests whether the moisture sensor 27 is operational. Assuming the moisture sensor has been successfully verified, a test is made in block 520 to determine whether a minimum critical machine speed has been achieved, and if not, the wrap arm is moved to the park position 312 illustrated in FIG. 5. With a minimum critical machine speed verified, control is transferred to block 524 which begins a data collection cycle, moving the wrap arm 22 to the full wrap or maximum position 310 illustrated in FIG. 5. A test is made in block 536 to verify that web speed is sufficiently stable, that accurate test results will be obtained. Assuming such verification is obtained, control is then transferred to block 538 which moves wrap arm 22 from the maximum position 310 to the unwrapped or minimum position 308. As mentioned above, control of wrap arm 22 by control block 538 may, optionally, require the wrap arm to be moved to the park position 312 rather than to the fully wrapped minimum position 308.

In control block 540, heat and moisture data is collected as wrap arm 22 is moved throughout its operational range of motion, and a representative example of the data obtained in control block 540 is illustrated in FIG. 6. As indicated by block 542, data collection continues until the wrap arm 22 is moved to its end point (either park position 312 or a fully unwrapped minimum position 308). Block 544 tests whether the observed moisture values lie within a reasonable range, the physical interpretation of which is a quick pass-fail decision as to whether the paper is (for some unusual reason) too wet or too dry. Assuming the pass-fail test is performed with a favorable outcome, control is transferred to block 546 which calculates the optimum wrap arm position $\phi_4$, using the technique described above with reference to FIG. 6. The wrap arm is then moved by control block 548 to the optimum wrap arm position $\phi_4$. Block 549 then stores a value in memory indicating that optimum mode has been achieved and this data is eventually tested in decision block 518.

As indicated at the bottom of FIG. 9a, control is then transferred to the top of the automatic control procedure, with the test then being performed by decision block 502. As mentioned, the optimum wrap arm position has been achieved, and is subsequently adjusted, if necessary, in control block 512, in response to a change in web speed, using a "ratio" or direct mathematical relation between web speed and wrap arm position change. Decision block 514 will test false, requiring further testing in decision blocks 516–522 to be performed, thus monitoring as to whether unusual perturbations in web speed or moisture change have occurred since the wrap arm was set to an optimum position. If necessary, recalculation and determination of an updated optimum wrap arm position will be required, with control being transferred to block 526.

Preconditioning Heater Operation

Figure 10A:
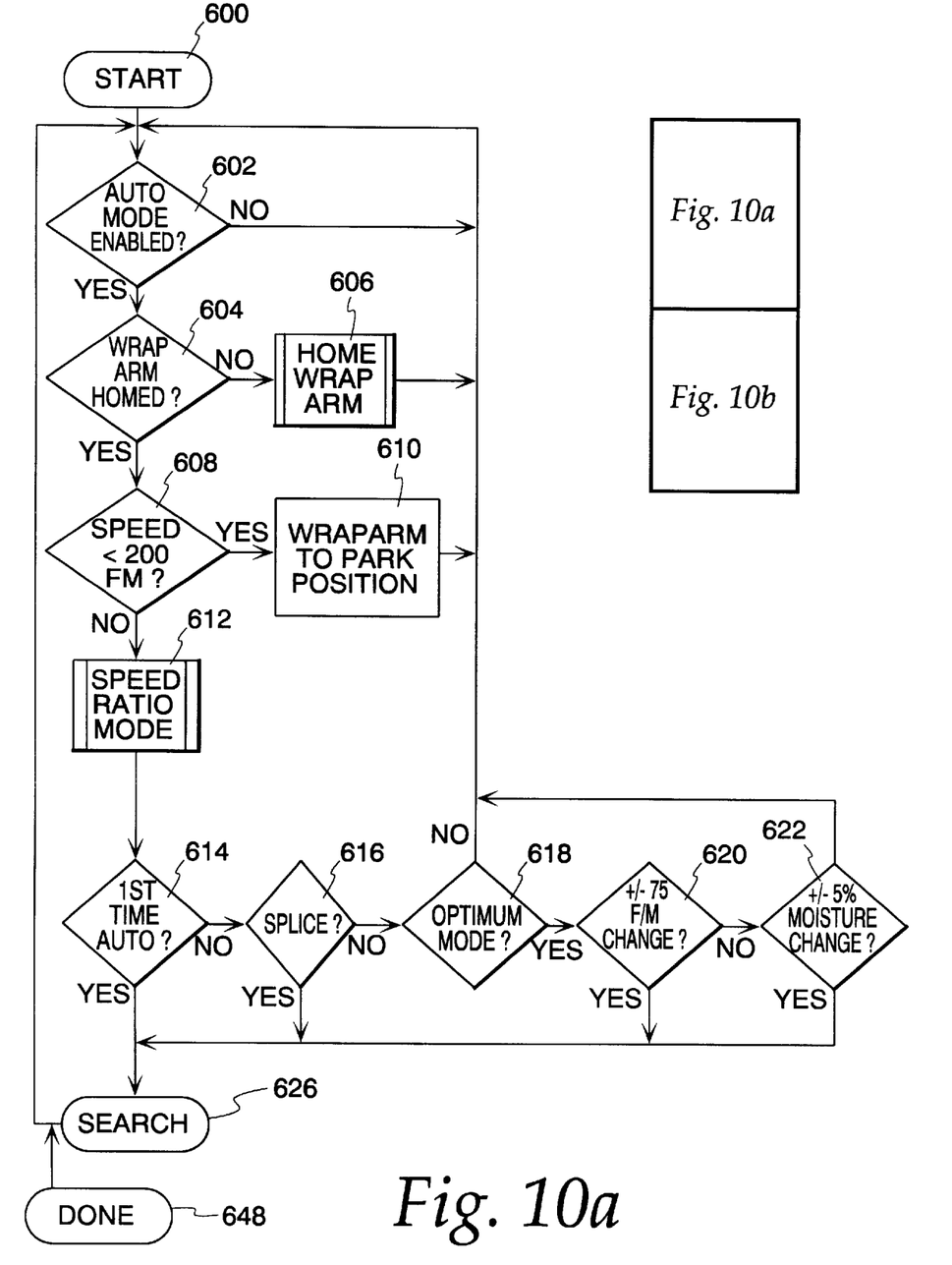
FIGS. 10a and 10b together comprise a flow chart indicating control of the heating means of FIG. 7.
Figure 10B:
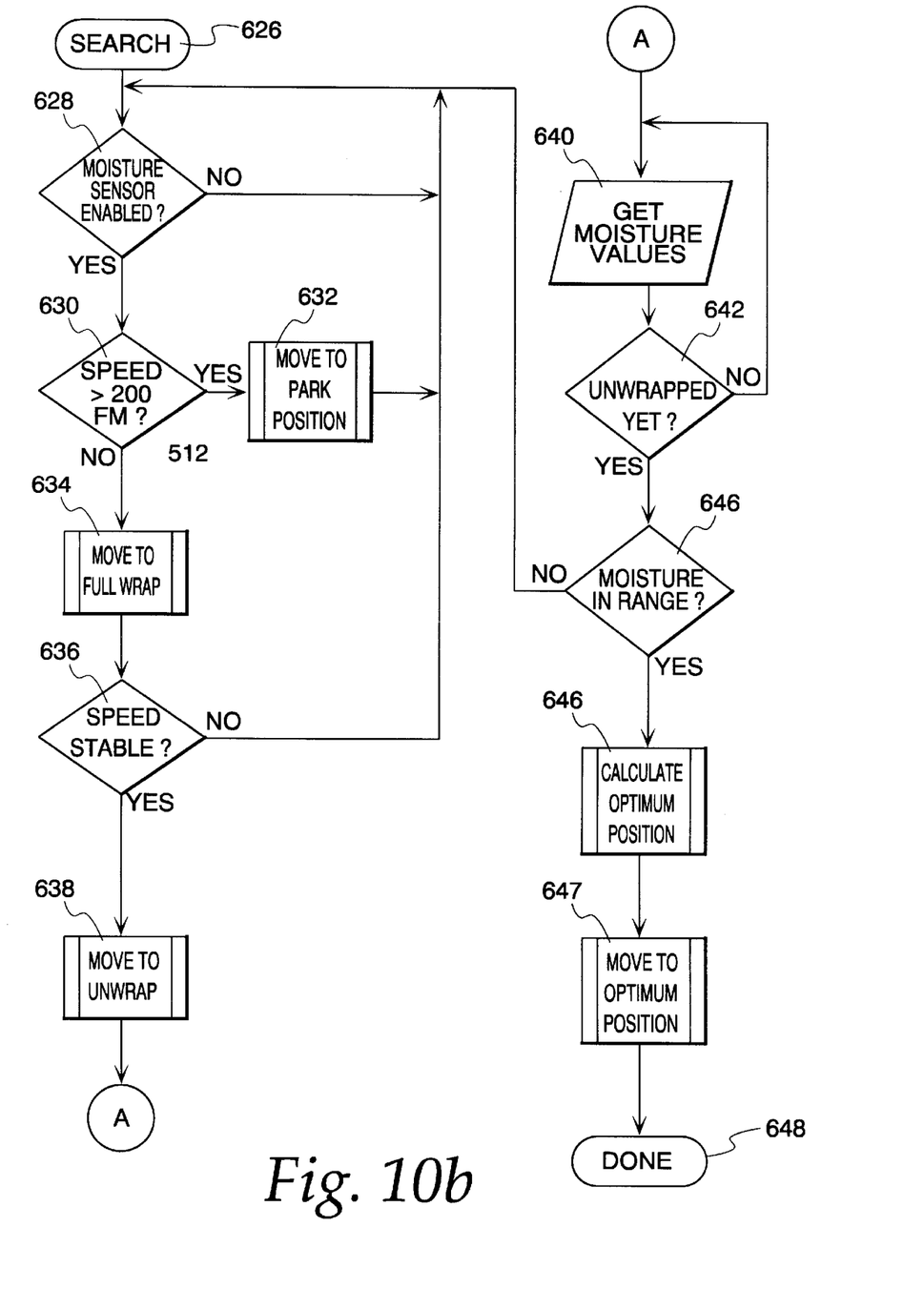

Referring now to FIGS. 10a and 10b, operation of the preconditioning heater 42 will be described. As will be seen herein, the methodology of control is similar to that previously described for the heater 24, with the exception of the calculation of optimum position, which has already been described with reference to FIGS. 7 and 8.

As mentioned, operation of manufacturing apparatus 5 is begun with loading the rolled webs 36, and threading the webs through the system, as illustrated in FIG. 1, for example. The heaters and optional showers are brought up to operating temperatures and pressures in preparation for a production run, indicated in FIG. 9a by block 600. Next, as indicated in decision element 602, query is made as to whether an automatic operating mode is enabled. Generally speaking, this contemplates two automatic control modes, the first focusing on the optimum positioning of wrap arm 40, and the second relating to the speed of web 31 past heater 42, as will be seen herein. If the automatic mode is not enabled, the electronic controller EC continues to poll the system to determine if the automatic mode has been updated. With the automatic mode enabled, control is transferred to decision block 604 which tests whether the wrap arm 40 is homed to the minimum position 372 in FIG. 7. If necessary, block 606 energizes the drive system (not shown) for wrap arm 40 to move it to the desired angular position. Next, a test is conducted in decision block 608 to determine if a minimum critical web speed is maintained in the machine, and, if not, block 610 moves wrap arm 40 to minimum position 372 (see FIG. 7). Control is then transferred to block 612, directed to a secondary control of manufacturing apparatus 5. Under control of block 612, the speed of web 31, controlled by control system 69, is monitored for ongoing changes during system operation. Basically, control block 612 calls for greater wrap as web speed increases, and lesser wrap as web speed decreases. It should be recognized that the wrap arm 40 can be manually positioned by an operator with or without assistance from system instrumentation. A control block 612 would perform web speed-related adjustments to such manual wrap arm positioning if the auto mode is enabled (see block 602).

Control is then transferred to block 614 which tests whether the automatic mode was previously initiated. If not, a test is made in block 616 as to whether a splice has been made in web 11. If a splice has been made, the control system assumes that a recalibration is necessary. Control block 618 tests whether an optimum wrap arm operation has previously been achieved, and if not, control is transferred to the beginning of the control loop, at block 602. If an optimum mode has been previously achieved, a test is made in block 620 as to whether the web speed has experienced an unacceptable perturbation, and if not, a test is made in block 622 to see whether an unacceptable perturbation in moisture has occurred. Block 620 tests whether a relatively small change in web speed has occurred. If a change is below a preset threshold amount, then control block 612 is allowed to proceed with a ratio control of the wrap arm position, directly related to the web speed. If, however, block 620 detects an acceptably large change in speed, then control block 612 is, in effect, relieved of further control, until a new operating point has been determined by a search routine indicated in block 626.

Referring now to FIG. 9b, a search initiated in block 626 transfers control to block 628 which tests whether the moisture sensor 45 is operational. Assuming the moisture sensor has been successfully verified, a test is made in block 620 to determine whether a minimum critical web speed has been achieved, and if not, the wrap arm is moved to the minimum position 372 illustrated in FIG. 5. With a minimum critical machine speed verified, control is transferred to block 624 which begins a data collection cycle, moving the wrap arm 40 to the minimum position 370 illustrated in FIG. 7. A test is made in block 636 to verify that web speed is sufficiently stable, that accurate test results will be obtained. Assuming such verification is obtained, control is then transferred to block 638 which moves wrap arm 40 from the unwrapped or minimum position 372 to the full wrapped position 370.

In control block 640, moisture data is collected as wrap arm 40 is moved throughout its operational range of motion, and a representative example of the data obtained in control block 640 is illustrated in FIG. 6. As indicated by block 642, data collection continues until the wrap arm 40 is moved to its end point (fully wrapped maximum position 370). Block 644 tests whether the observed moisture values lie within a reasonable range, the physical interpretation of which is a quick pass-fail decision as to whether the paper is (for some unusual reason) too wet or too dry.

Assuming the pass-fail test is satisfactorily performed, control is transferred to block 646 which calculates the optimum wrap arm position $\phi_3$, using the technique described above with reference to FIG. 8. Wrap arm 40 is then moved by control block 648 to the optimum wrap arm position $\phi_3$. Block 646 then stores a value in memory indicating that optimum mode has been achieved and this data is eventually tested in decision block 618. As indicated at the bottom of FIG. 9a, control is then transferred to the top of the automatic control procedure, with the test then being performed by decision block 602.

As mentioned, the optimum wrap arm position has been achieved, and is subsequently adjusted, if necessary, in control block 612, in response to a change in web speed, using a "ratio" or other direct mathematical relation between web speed and wrap arm position change. Decision block 614 will test false, requiring further testing in decision blocks 616–622 to be performed, thus monitoring as to whether unusual perturbations in web speed or moisture change have occurred since the wrap arm was set to an optimum position. If necessary, recalculation and determination of an updated optimum wrap arm position will be required, with control being transferred to block 626.

With the present invention, the controls described above with reference to FIG. 2 are also employed in the double-backer system described above with reference to FIGS. 3a and 3b. More specifically, the controls described above with reference to FIG. 1 are identically employed for the double-backer inner board 131 and double-backer outer board 153 of FIG. 3a. Further, these same controls are employed for the bonding of liner 121 to the double-backer inner board 131.

From the foregoing, it will be appreciated that the invention provides a novel and improved corrugation system. The invention is not limited to the particular embodiment described above or to any particular embodiment. In particular, the above-mentioned "electronic controller" may be, but is not limited to being, an electronic or otherwise automated controller, a processor, a computer or a logical operator. Also, the above-mentioned "board" may be, but is not limited to being board, paper or other pulpy material.

Terms such as "horizontal," "vertical," etc. are used herein only to describe the orientation of the various components relative to one another, when the invention is in an upright position as shown in the drawings. It should be understood that the invention may be operated in various different orientations, and the use of these terms is not intended to imply otherwise, nor to limit the description or claims to an invention disposed in a particular orientation.

What is claimed is:

1. Apparatus for preparing a paper web having first and second opposed major surfaces and containing moisture, for corrugation, comprising:

heating means with a curved outer heated surface;

a wrap arm movable across the outer heated surface of the heater, for wrapping the paper web across the heating means;

means for moving the wrap arm between first and second positions so as to bring greater and lesser portions of the paper web in contact with the heating means;

sensor means for sensing, for the different positions of the wrap arm, the moisture carried of the paper;

means for determining a low moisture wrap arm position at which a rate of increase of web moisture increases;

means for determining a high moisture wrap arm position at which a rate of increase of web moisture is negligible;

means for determining an offset comprising one-half of the difference between the low moisture wrap arm position and the high moisture wrap arm position;

means for determining a desired operating position of the wrap arm by adjusting the high moisture wrap arm position toward the low moisture wrap arm position by an amount corresponding to the offset; and means for moving the wrap arm to the desired operating position.

2. The apparatus of claim 1 wherein the means for moving the wrap arm between first and second positions wrap arm continuously moves the wrap arm between said first and said second positions.

3. The apparatus of claim 1 wherein the means for moving the wrap arm between first and second positions moves the wrap arm from a first position of lesser wrap to a second position of greater wrap.

4. The apparatus of claim 1 wherein the second major surface of the paper web contacts the heated surface and the surface moisture of the paper web is sensed at the first major surface of the paper web.

5. The apparatus of claim 1 wherein the heating means is generally cylindrical and the wrap arm is mounted for movement about a central axis of the cylinder.

6. The apparatus of claim 1 further comprising:
   conveyor means conveying the paper web across the heated surface;
   speed sensing means for observing the speed of the paper web across the heated surface;
   speed-related adjusting means for adjusting the wrap arm according to the speed of the paper web.

7. The apparatus of claim 6 wherein the speed-related adjusting means moves the wrap arm toward the high temperature wrap arm position as the speed of the paper web increases.

8. The apparatus of claim 6 wherein the speed-related adjusting means moves the wrap arm toward the low temperature wrap arm position as the speed of the paper web decreases.

* * * * *